Sept. 11, 1923.  T. MIYAGI  1,467,907
NUT LOCK
Filed April 15, 1922
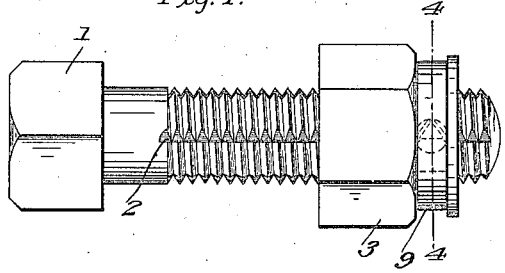
Fig. 1.
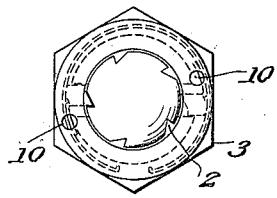
Fig. 2.
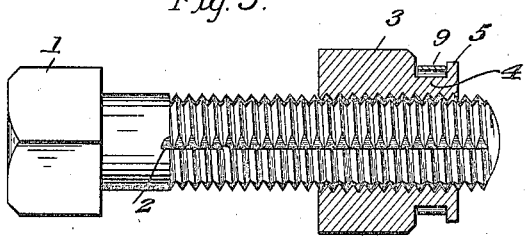
Fig. 3.
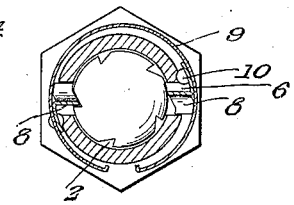
Fig. 4.
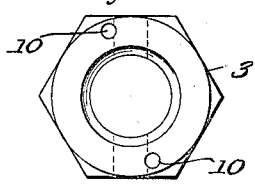
Fig. 5.
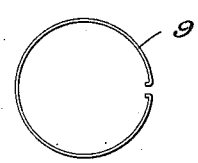
Fig. 7.
Fig. 9.
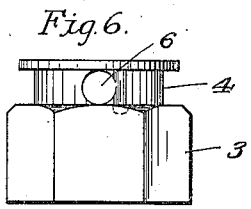
Fig. 6.
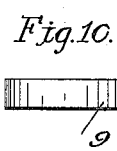
Fig. 8.
Fig. 10.
Inventor:
Takeo Miyagi.
By
Victor J. Evans Attorney.

Patented Sept. 11, 1923.

1,467,907

UNITED STATES PATENT OFFICE.

TAKEO MIYAGI, OF WAIPAHU, OAHU, TERRITORY OF HAWAII.

NUT LOCK.

Application filed April 15, 1922. Serial No. 552,937.

*To all whom it may concern:*

Be it known that I, TAKEO MIYAGI, a subject of the Emperor of Japan, residing at Waipahu, Oahu, in the Territory of Hawaii, have invented new and useful Improvements in Nut Locks, of which the following is a specification.

My present invention has reference to a means for locking a nut on a bolt.

An object is to produce a locking means between a nut and bolt which shall be of a simple construction that will permit of the nut being screwed any desired distance homewardly on the bolt but effectively held against movement in an unscrewing direction, said means being also operable to permit of the unscrewing of the nut from the bolt.

A further object is to produce a means for locking a nut on a bolt in which the bolt has its threaded shank grooved longitudinally and in which the nut which is screwed on the bolt has dogs whose toothed ends pass through openings in the nut to be received in the grooves of the bolt, spring means holding the dogs in such position, and said nut being provided with openings whereby an instrument may be inserted to retract the dogs against the pressure of their spring means to permit of the unscrewing of the nut from the bolt.

The foregoing, and other objects which will present themselves as the nature of the invention is better understood, may be accomplished by a construction, combination and operative association of parts such as is disclosed by the drawing which accompanies and which forms part of this application.

In the drawing:—

Figure 1 is an elevation of a nut locked on a bolt in accordance with this invention.

Figure 2 is an end view thereof.

Figure 3 is a side elevation of a nut and the spring member which influences the locking means in section.

Figure 4 is a sectional view approximately on the line 4—4 of Figure 1.

Figure 5 is a front elevation of the nut.

Figure 6 is a side elevation thereof.

Figure 7 is a perspective view of one of the locking dogs.

Figure 8 is a plan view thereof.

Figure 9 is a plan view of the split spring ring.

Figure 10 is an elevation thereof.

Referring now to the drawing in detail, the numeral 1 designates a bolt of the ordinary construction, which, however, has its threaded shank grooved longitudinally, as at 2. The shank 1 may be provided with any desired number of grooves but each of the grooves defines a straight side wall and an angle side wall.

The nut which is screwed on the bolt is indicated by the numeral 3, the said nut being also of the usual construction except, in the present instance, I provide the same with an extension in the nature of a cross sectionally rounded neck 4 and form on the outer end of the neck an annular upstanding flange 5. The neck 4, at diametrically opposed points is provided with openings 6 that communicate with the bore thereof. Resting on the rounded wall of the neck are the rounded tail portions 7 of dogs 8. The toothed or active ends of the dogs are designed to be received through the openings 6 and to engage one of the grooves 2 of the bolt 1. Arranged on the neck and surrounding the tail portions 7 of the dogs 8 there is a split spring ring 9. This ring contacting the dogs, forces the same through the openings 6 into engagement with the grooves of the bolt. By reference to the drawing, it will be seen that the active or toothed portions 8 of the dogs are angular in cross section, which permits of the dogs ratcheting over the walls of the grooves when the nut 3 is being screwed home on the bolt, but which likewise prevents the unscrewing of the nut from the bolt.

The flange 5 of the nut 3 is provided with rounded openings 10 that are arranged opposite the curved or rounded tail portions 7 of the dogs 8. By inserting a suitable pointed instrument through the openings 10, the same will be brought under the tail 7 of the dog to force the toothed portions 8 thereof out of engagement with the grooves of the nut and likewise expand the spring retaining ring 9.

It is thought that the foregoing description, when taken in connection with the drawing will fully set forth the construction, operation and advantages of the improvement to those skilled in the art to which such inventions relate.

Having described the invention, I claim:—

In a means for locking a nut on a bolt, the combination with a nut having its shank grooved to define a straight side wall, an angle side wall, a nut screwed on the bolt, said nut having an annular neck extension whose outer end is flanged, said neck being provided with openings, dogs having angle toothed portions and curved tail portions, the latter resting on the neck and the former received in the openings and engaging in the grooves of the bolt, a split spring ring arranged on the neck over the dogs, and the flange on the neck being provided with openings disposed opposite the tails of the dogs, as and for the purpose set forth.

In testimony whereof I affix my signature.

TAKEO MIYAGI.